United States Patent
Chandrasekaran

(10) Patent No.: US 9,152,644 B2
(45) Date of Patent: Oct. 6, 2015

(54) SYSTEMS AND METHODS FOR PROVIDING COLLABORATIVE EDITING

(75) Inventor: Karthik Chandrasekaran, Bangalore (IN)

(73) Assignee: Novell, Inc., Provo, UT (US)

(*) Notice: Subject to any disclaimer, the term of this patent is extended or adjusted under 35 U.S.C. 154(b) by 1853 days.

(21) Appl. No.: 12/346,385

(22) Filed: Dec. 30, 2008

(65) Prior Publication Data

US 2010/0169269 A1    Jul. 1, 2010

(51) Int. Cl.
*G06F 17/30*    (2006.01)

(52) U.S. Cl.
CPC .................... *G06F 17/30165* (2013.01)

(58) Field of Classification Search
None
See application file for complete search history.

(56) References Cited

U.S. PATENT DOCUMENTS

| | | | |
|---|---|---|---|
| 5,337,407 A * | 8/1994 | Bates et al. ................... | 715/751 |
| 5,339,388 A | 8/1994 | Bates et al. | |
| 5,339,389 A | 8/1994 | Bates et al. | |
| 5,515,491 A | 5/1996 | Bates et al. | |
| 5,940,082 A | 8/1999 | Brinegar et al. | |
| 6,233,600 B1 | 5/2001 | Salas et al. | |
| 6,280,325 B1 * | 8/2001 | Fisk ............................... | 463/19 |
| 6,426,962 B1 * | 7/2002 | Cabezas et al. ............... | 370/516 |
| 6,529,905 B1 | 3/2003 | Bray et al. | |
| 6,631,137 B1 * | 10/2003 | Lorrain et al. ................ | 370/401 |
| 6,665,675 B1 * | 12/2003 | Mitaru .......................... | 1/1 |
| 6,687,878 B1 | 2/2004 | Eintracht et al. | |
| 6,772,216 B1 * | 8/2004 | Ankireddipally et al. .... | 709/230 |
| 6,948,163 B2 | 9/2005 | Melahn et al. | |
| 7,127,501 B1 | 10/2006 | Beir | |
| 7,233,933 B2 | 6/2007 | Horvitz et al. | |
| 7,242,389 B1 | 7/2007 | Stern | |
| 2004/0003042 A1 | 1/2004 | Horvitz et al. | |
| 2004/0215772 A1 * | 10/2004 | Dinker et al. ................. | 709/225 |
| 2005/0008163 A1 | 1/2005 | Leser et al. | |
| 2005/0028006 A1 | 2/2005 | Leser et al. | |
| 2005/0033811 A1 | 2/2005 | Bhogal et al. | |
| 2005/0033813 A1 | 2/2005 | Bhogal et al. | |
| 2005/0084082 A1 | 4/2005 | Horvitz et al. | |
| 2005/0125536 A1 * | 6/2005 | Bucher ......................... | 709/225 |

(Continued)

OTHER PUBLICATIONS

"N-Brain, Inc. Releases World's First Real-Time Collaborative Development Tool for Software Engineers", *Business Wire*, http://www.reuters.com/article/pressRelease/idUS115828+06-Mar-2008+BW20080306, (Mar. 6, 2008), 4 pgs.

(Continued)

*Primary Examiner* — Rehana Perveen
*Assistant Examiner* — Raheem Hoffler
(74) *Attorney, Agent, or Firm* — Schwegman Lundberg & Woessner, P.A.

(57) ABSTRACT

Systems and methods are presented for providing collaborative editing. An embodiment collaboratively edits a computer file using a plurality of computers in a network, where the computers are connected using a token ring, each of the computers has a local copy, and a first computer has edited its local copy and performs the method. A token circulating around the token ring is captured, and a location of the edited portion of the local copy of the file is determined. The location is broadcast to the other computers. Conflicts are received from the other computers, and the conflicts from the other computers are reconciled with the edited portion of the local copy of the file to provide reconciled edits to the file. The local copy of the file is updated with the reconciled edits. A data packet with the reconciled edits is created and transmitted around the token ring.

18 Claims, 3 Drawing Sheets

(56) References Cited

U.S. PATENT DOCUMENTS

| | | |
|---|---|---|
| 2006/0010206 A1 | 1/2006 | Apacible et al. |
| 2006/0029296 A1 | 2/2006 | King et al. |
| 2006/0098899 A1 | 5/2006 | King et al. |
| 2006/0294467 A1* | 12/2006 | Auterinen ............ 715/723 |
| 2007/0064005 A1 | 3/2007 | Antoine |
| 2007/0244906 A1 | 10/2007 | Colton et al. |
| 2007/0250506 A1 | 10/2007 | Stevens et al. |
| 2007/0288415 A1* | 12/2007 | Sapp et al. ............ 706/47 |
| 2008/0115103 A1 | 5/2008 | Datars et al. |
| 2008/0195945 A1 | 8/2008 | Vaughan et al. |
| 2008/0244418 A1 | 10/2008 | Manolescu et al. |
| 2009/0070388 A1* | 3/2009 | Kolke et al. ............ 707/201 |
| 2010/0057785 A1* | 3/2010 | Khosravy et al. ........ 707/203 |
| 2010/0083136 A1* | 4/2010 | Komine et al. .......... 715/753 |

OTHER PUBLICATIONS

"Simple Object Access Protocol (SOAP) 1.1", *W3C Note*, http://www.w3.org/TR/2000/NOTE-SOAP-20000508/, (May 8, 2000), 30 pgs.

* cited by examiner

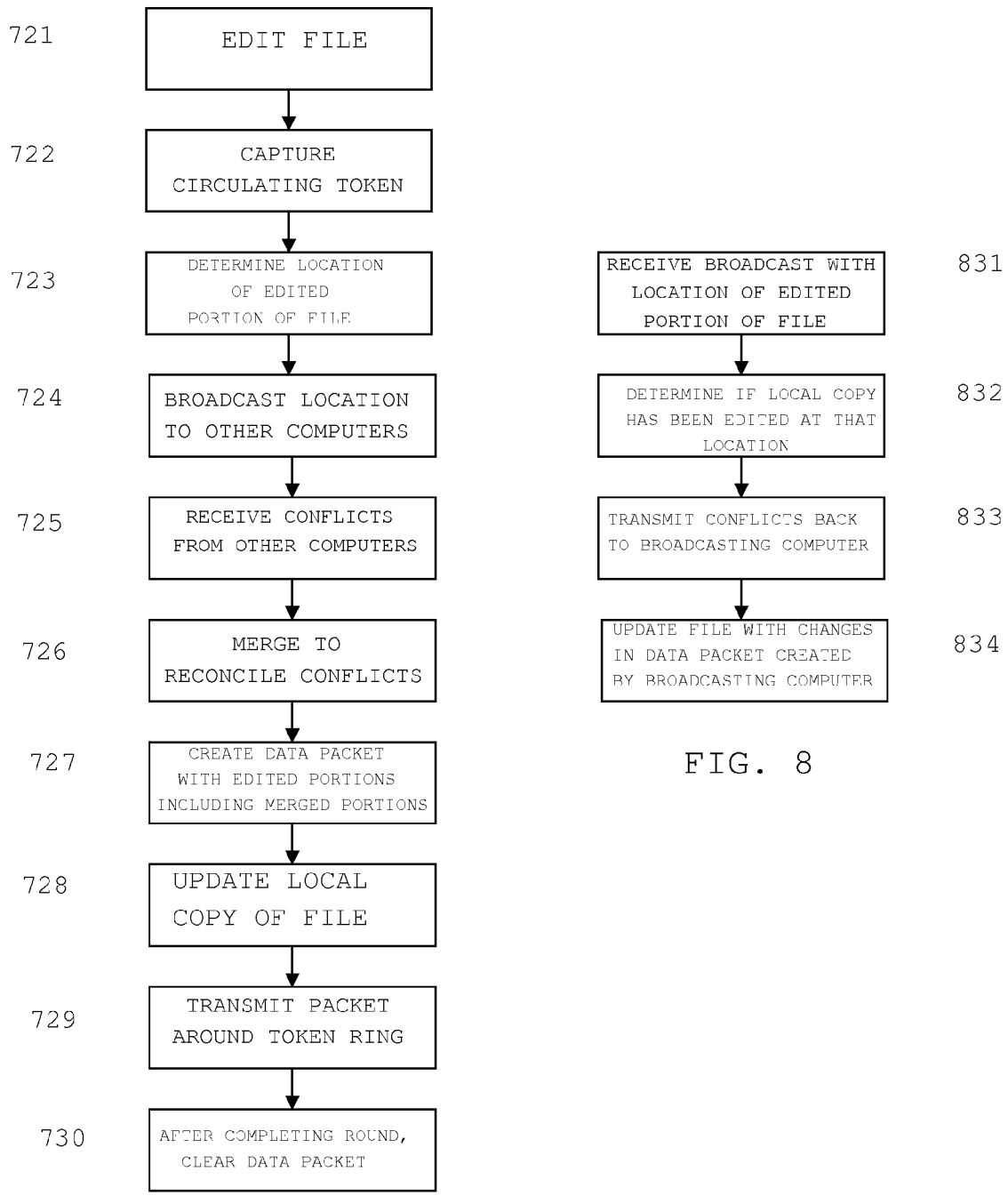

SYSTEMS AND METHODS FOR PROVIDING COLLABORATIVE EDITING

FIELD

This disclosure relates generally to collaborative editing, and more particularly to systems and methods to provide real-time collaborative editing.

BACKGROUND

A collaborative editor is a software application that allows several people using different computers to edit a computer file. Collaborative editors include both real-time and non-real-time editors. Real-time collaborative editors allow users to edit the same file at the same time. A challenge encountered in providing real-time collaborative editing is the coordination of edits from remote users. These remote edits may conflict with the user's own local edits and are originally created in versions of the file that never existed locally.

Another challenge with collaborative editors is to reduce or minimize the network traffic attributed to edit updates sent to the other computers involved with the collaborative editing. This is a particular challenge for real-time collaborative editors that broadcast their updates to all the other computers. For example, Nbrain, Inc. has implemented a real-time collaborative editor which uses a broadcast-based update of the files, in which all computers broadcast their changes to all other computers. These broadcasts are collated by each local copy of the real-time collaborative editor and the files are kept synchronized across all the computers. Though this architecture may work for a small number of users, it will not scale well for medium to large number of users because the number of transmissions required by this architecture is an order of n*n where 'n' is the number of computers involved in the real-time collaborative editing. Current real-time collaborative editors are tied to a particular file type for editing (for example, the editors can edit only text files).

SUMMARY

An embodiment collaboratively edits a computer file using a plurality of computers in a network, where the computers are connected using a token ring, each of the computers has a local copy, and a first computer has edited its local copy and performs the method. According to the embodiment of the method performed by the first computer in the network, a token circulating around the token ring is captured, and a location of the edited portion of the local copy of the file is determined. The location is broadcast to the other computers. Conflicts are received from the other computers, and the conflicts from the other computers are reconciled with the edited portion of the local copy of the file to provide reconciled edits to the file. The local copy of the file is updated with the reconciled edits. A data packet with the reconciled edits is created and transmitted around the token ring.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIG. 7 illustrates an embodiment of a process implemented by a broadcasting computer in the real-time collaborative editor network that has edited a file and captured a circulating token.

FIG. 8 illustrates an embodiment of a process implemented by other computers than the broadcasting computer in the real-time collaborative editor network.

DETAILED DESCRIPTION

Figure 1:
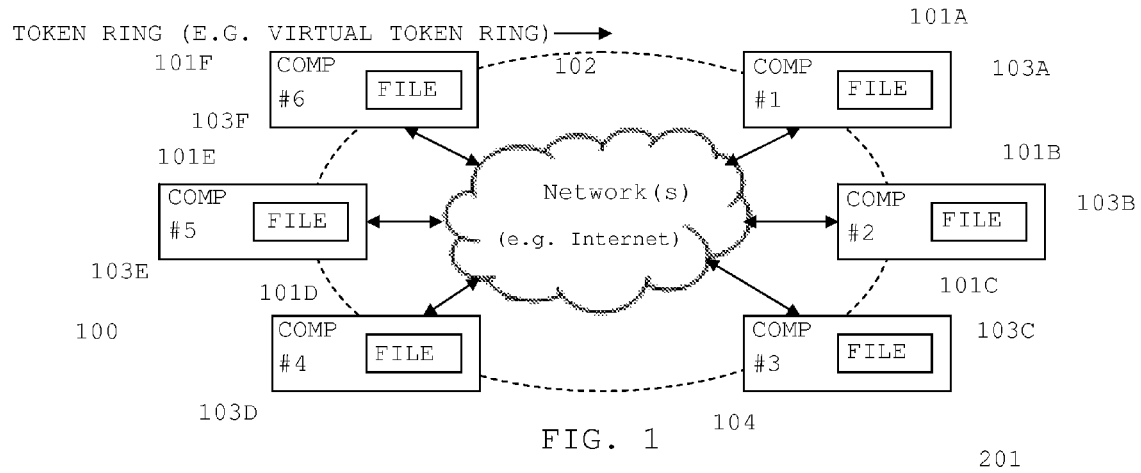
FIG. 1 illustrates real-time collaborative editor network with a virtual token ring architecture, according to various embodiments of the present subject matter.

The present subject matter uses a modified token ring architecture to exchange updates among the various computers used to perform the real-time collaborative editing. The token ring local area network (LAN) technology is a local area network protocol which resides at the data link layer (DLL) of the Open Systems Interconnection basic reference model (OSI model). The computers that are involved in the real-time collaborative editing are connected in the form of a virtual token ring (not a physical LAN). Thus, the virtual token ring may be formed on top of an existing Internet connection. This technology uses a special frame (e.g. a three-byte frame) called a token that travels around the ring. The frame travels completely around the loop. As in a token ring network, an empty token keeps circulating in the ring. When a computer has been used to edit a file in the real-time collaborative editor, then that computer grabs the token and changes the token into a data frame.

XML is used as the internal storage format for the files edited using the real-time editor. The use of the XML format to represent these files permits the real-time editor to handle a variety of types of files (e.g. spreadsheets, PowerPoint presentations, various styled documents, source code, and images). The data frame contains the edited portion of the file, which is an XML fragment represented as a SOAP (Simple Object Access Protocol) message. SOAP is a protocol for exchanging XML-based messages over computer networks, normally using HTTP/HTTPS. SOAP forms the foundation layer of the web services protocol stack, and provides a basic messaging framework upon which abstract layers can be built. Since XML documents are used to represent the files, presentations, spreadsheets, documents and images can be edited by the real-time collaborative editor. SOAP messages enable the real-time collaborative editor to function over the Internet since the SOAP messages are transmitted using the HTTP/HTTPS protocol. Secure Sockets Layer (SSL) encryption may be used to send the edit updates secure over the Internet.

When the user edited a file, the user's computer grabs the token and locates the portion of the XML representation of the file where the edit has been made. The computer sends out a broadcast message containing the location of the change in the XML internal representation. The broadcast message does not include the edited changes themselves. Broadcasting the location and not the entire change minimizes the amount of data that is broadcast, thus reducing the network traffic.

According to various embodiments, the location of the change in the XML document is represented by numbers
} obtained from a post-order or in-order traversal of the DOM (Document Object Model) of the XML representation. DOM is a platform-independent and language-independent standard object model used to represent HTML or XML and related formats. DOM provides a structural representation (e.g. a tree) of the document used to identify the location of the edit.

Upon receiving the broadcast location of the edit, the other computers check their local edited documents for any conflicts. A conflict occurs when overlapping portions of the file have been edited by the user whose computer broadcasted the message and by the user whose computer received the broadcast message. All computers that have conflict with the location of the sent message send their portion of the edited file that has the conflict back to the broadcasting computer. The broadcasting computer waits for a fixed time and merges all the conflicting portions of the file. The fixed or predetermined amount of time is a length of time appropriate to allow the other computers to check for conflicts and send their portion of the edited file that has conflict back to the broadcasting computer. The broadcasting computer incorporates the merged portions into its local copy of the file, and loads the data frame with the edited file. The token containing the data frame travels around the token ring. Each computer in the ring reads the edits from the token and makes corresponding changes to its local copy of the file. Once the token completes a cycle and returns to the sender, the data in the data frame is cleared and an empty token once again travels around the token ring waiting for the next computer to grab the token to broadcast the location of its edited portion of the file. Since the updates are merged by the broadcasting computer, the files are not locked when the real-time collaborative editor performs an update. Since the files are not locked, the editing of the files can proceed simultaneously.

The edits to the file in the real-time collaborative editor are exchanged in a coordinated manner by the token ring architecture. Each computer which has edited its local copy of the file is able to grab an empty token, broadcast the location of the change(s) to the other computers, receive any conflicts from the other computers, and then transmit its changes to the file after broadcasting the location of the changes to the other computers and merging any conflicts from the other computers into the file. Synchronization of the updates from the various computers is thus achieved.

The use of token ring architecture for transmitting the edit updates is not network intensive since only a single token needs to be transmitted around the virtual token ring. It is a well established fact that the token ring architecture has excellent performance under heavy load. Thus, the real-time collaborative editor scales up as additional users to edit the file are added. The user broadcasts only the location of the changes to the XML representation of the file to allow the conflicting portions of the file to be merged, which reduces the network traffic since only a few numbers, obtained using a DOM representation of the XML files, are involved in the broadcast as opposed to the entire edited portion of the file being broadcast.

The addition or deletion of a computer to the token ring is a simple process with only two links being added or deleted to the neighboring computers as opposed to connection with all the computers in a broadcast based real-time collaborative editor. To avoid failure of the token ring due to one of the links being down, some embodiments use a dual ring such that the backup ring takes over if the primary ring fails. The dual ring provides redundancy to the virtual token ring architecture.

FIG. 1 illustrates real-time collaborative editor network with a virtual token ring architecture, according to various embodiments of the present subject matter. The illustrated network 100 includes, by way of example, six computers 101A-F. The network 100 can include additional or fewer computers than the six that are illustrated. In the illustrated embodiment, the computers are networked together through an Internet. Other network links (e.g. LAN and/or WAN links) may also be used to provide the communication links for the real-time collaborative editor network. The illustrated computers are used to collaboratively edit a file. Each of the computers has a local copy of the file 103A-F on which edits can be made. As illustrated in FIG. 1, the computers in the collaborative editor network are linked together in a virtual token ring 104 through which a token is circulated.

Figure 2:
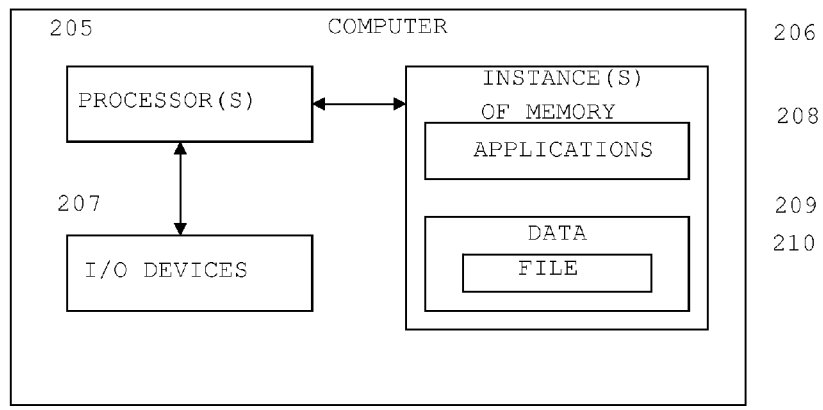
FIG. 2 illustrates an embodiment of a computer, such as may be used in the real-time collaborative editor network illustrated in FIG. 1.

FIG. 2 illustrates an embodiment of a computer, such as may be used in the real-time collaborative editor network illustrated in FIG. 1. The illustrated computer 201 includes at least one processor 205, one or more instances of memory 206, and input/output devices 207 such as a keyboard, a mouse and monitor(s). The processor(s) may include a single processor, multi-core processors or multiple processors in a distributed processing system. Two or more instances of memory can include different memory types or locations.

As is understood by those of ordinary skill in the art, the memory 206 includes sets of instructions capable of being operated on by the processor(s) and directing the processor(s) to perform various processes, including but not limited to processes to provide real-time editing. The illustrated memory instance(s) 206 include applications 208 and data 209. The illustrated data 209 includes a file 210 that is being edited using the real-time collaborative editor.

Figure 3:
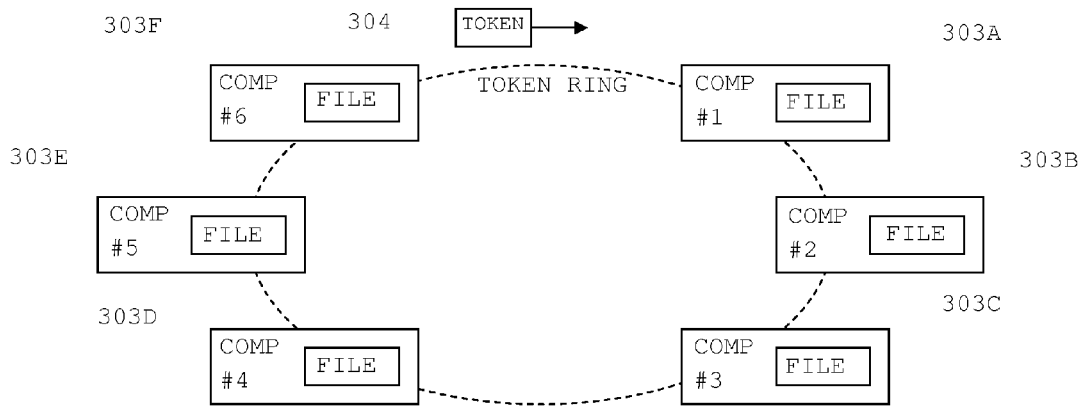
FIGS. 3-6 illustrate an embodiment of a process implemented by the real-time collaborative editor.

FIGS. 3-6 illustrate an embodiment of a process implemented by the real-time collaborative editor. As illustrated in FIG. 3, an empty token circulates around the token ring, passing from the first computer 303A, to the second computer 303B and subsequently to each of the other computers 303C-F. In the illustrated example, the local copy of the file in the first computer 303A has been edited. Because its local copy of the file has been edited, the first computer 303A grabs the empty token. The availability of the empty token indicates that the frames circulating the ring do not include a data frame with edits from another computer. If the empty token is not available immediately, the first computer waits until such time that it becomes available.

Figure 4:
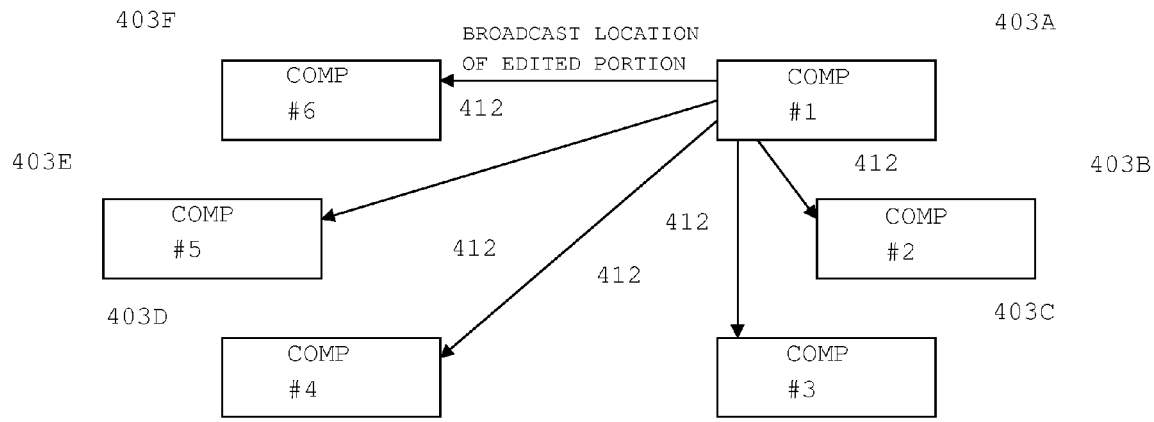
Figure 5:
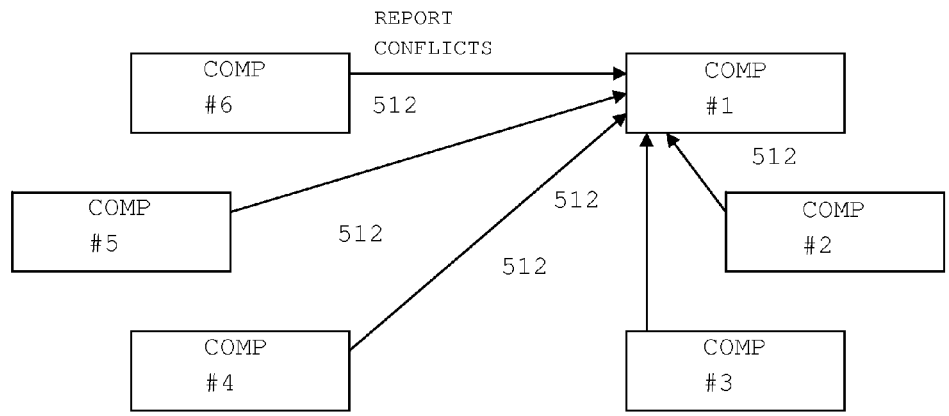
Figure 6:
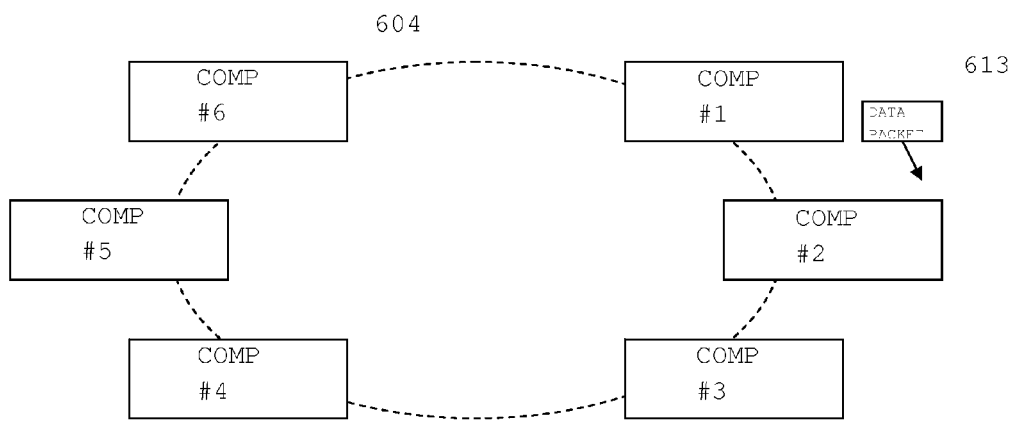

The first computer determines the location of the edited portion of the file, and as illustrated in FIG. 4, the first computer 403A broadcasts the location of the edited portion to the other computers (403B-F) in the collaborative editor network. The local files are stored using the XML format. The broadcasting computer (the first computer the illustrated process) uses DOM to identify the location of the edited portions as numbers. The edited portion of the XML document is determined by representing the XML document as a DOM tree and then traversing the tree in in-order or post-order and then computing the number of the nodes in the DOM tree that are edited. These nodes could represent XML elements, attributes or text. Along with the edit locations, the IP or hostname of the computer is also broadcast. Thus, the broadcast signals 412 from the broadcasting computer 403A transmit these numbers to the other computers, which has little effect on the bandwidth of the network. The XML fragment that is broadcast is packaged in the form of a SOAP message. The SSL encryption may be used for transmitting the SOAP message if the message needs to be transmitted securely.

Each of the other computers receive the broadcast signal, calculate the location of its portion of the edited file, and compare the broadcasted location identifying the edited portion of the file in the broadcast computer to its own local copy of the file to determine if it has also edited this portion of the file. If a conflict is found, these other computers report the conflicts (illustrated as signals 512) back to the broadcasting computer. The signals 512 sent back to the broadcasting computer include the conflicting portion of the file. Computers need not send a signal if a conflict is not detected by the computer.

The broadcasting computer is in a state to receive these conflict signals for a predetermined amount of time after the broadcasting computer broadcasts the location of its edited portion. All conflicts are expected to be reported during this predetermined amount time. After this predetermined amount of time elapses, the broadcasting computer merges all of the conflicting portions with its changed portion, and updates its local copy of the file. The broadcasting computer merges all the XML fragments that are received from the other computers. This merging need not be done at the level of internal XML representation. The real-time collaborative editor takes care of rendering these conflicting edited portions and the merging of the conflicting portions is done at the editor level. The broadcasting computer also loads a data frame 613 with the edited portion of the file into the token, which circulates around the token ring 604. The data packet contains the edited portions as well as the location of the edited portions of the file. The location of the edited portions are computed based on the in-order or pre-order traversal of the DOM representation. Each computer in the ring reads the edits from the token and makes corresponding changes to its local copy of the file. The data in the data frame is cleared once the token completely travels around the token ring, and an empty token travels around the token ring waiting for the next computer to grab it update the network with its edited portion of the file.

FIG. 7 illustrates an embodiment of a process implemented by a broadcasting computer in the real-time collaborative editor network that has edited a file and captured a circulating token. For example, the illustrated process can be performed by the first computer in the network illustrated in FIGS. 3-6. According to the illustrated process, the computer is used to edit a local copy of the file as illustrated at 721, and then the computer captures the empty token circulating around the token ring as illustrated at 722. The computer determines the location of the edited portion of the file at 723, and then broadcasts that location to the other computers in the real-time collaboration editor network, as illustrated at 724. The computer then, as illustrated at 725, receives conflicts, if any, from other computers in the network that have also edited that portion of the file in its local copy of the file. At 726, the computer reconciles the conflicts with its own edited portion of its local copy to provide reconciled edits, and then creates a data packet containing the reconciled edited portions of the file as illustrated at 727. The broadcasting computer updates its local copy of the file at 728, and transmits the packet around the token ring, as illustrated at 729. At 730, after the packet completely circulates the token ring, the computer clears the data packet.

FIG. 8 illustrates an embodiment of a process implemented by other computers than the broadcasting computer in the real-time collaborative editor network. For example, the illustrated process can be performed by the second, third, fourth, fifth or sixth computer in the network illustrated in FIGS. 3-6. At 831, the non-broadcasting computer receives a broadcast signal from the broadcasting computer with the location of the edited portion of the file. The non-broadcasting computer then determines if its local copy has been edited at the broadcasted location, as illustrated at 832. If the edited portion of the file has been edited, then the non-broadcasting computer transmits a conflict signal, including the conflicting portion of the file, back to the broadcasting computer, as illustrated at 833. After sending the conflict signal, the non-broadcasting computer waits for the data packet to circulate around the token ring. The data packet was created by the broadcasting computer after reconciling its changes to the reported conflicts from the non-broadcasting computers. The non-broadcasting computer updates its file with the changes identified in the data packet, as illustrated at 834.

It may be possible that a non-broadcasting computer will have a late edit to the file that conflicts with the broadcasted location. For example, the edit may have occurred after the broadcasting computer had sent its edit location and the predetermined amount of time expired for the broadcasting computer receive the conflicting edits. In this case, the non-broadcasting computer that has the late conflicting edit would set a bit in the data packet upon receiving the data packet as it circulated around the token ring. This bit is similar to the priority bit in the token ring, where the priority bit is used when a computer wants to transmit a data packet on priority. The computer that has the conflicting edit does not immediately grab the data packet and transmit. Instead the computer waits for the data packet to complete a circle in the ring and for the data packet to be cleared by the original transmitting computer. Once the data packet is cleared by the original computer, the other computers see that the priority bit has been set and do not grab the token. The computer that had the conflicting edit grabs the token and becomes the new broadcasting computer that performs the process described above to generate the data packet. After the data packet is read by all the other computers and the data packet reaches back the computer that had the conflicting edit, it clears the priority bit and clears the data packet. The empty token now circulates in the ring. The computers that have conflicting portions but have missed the broadcast are thus able to incorporate their conflicting portions without having other computers intervene by grabbing the token to update other portions of the file with its updates.

The present subject can be used in real-time collaborative editors for synchronizing the update of the files across networks. The modified token ring architecture may be employed for other kinds of collaboration for example a collaborative session in which several computers simultaneously remote control another computer on the network and the computers synchronize their updates. The modified token ring architecture may also be used for simultaneous updates to Wiki pages, web page design across the globe and any other document that can be internally represented by an XML document. The XML documents may be processed and merged by simple implementations. Several implementations of the SOAP protocol exist which may be used for packaging the XML document edits as SOAP messages. Synchronization of the various computers for updates is handled at the application level using the token ring architecture and does not require any real time support from the OS.

One of ordinary skill in the art will understand that, the illustrated processes and entities can be implemented using software, hardware, and combinations of software and hardware. The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented as a set of instructions contained on a computeraccessible medium capable of directing a processor to perform the respective method. The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method for collaboratively editing a computer file using a plurality of computers in a network, wherein the computers are connected using a token ring, each of the computers has a local copy of the file, a first computer has edited its local copy of the file, and the method is performed by the first computer, the method comprising:
   capturing a token circulating around the token ring;
   determining a location of the edited portion of the local copy of the file;
   broadcasting the location to the other computers;
   receiving conflicts from the other computers;
   reconciling the conflicts from the other computers with the edited portion of the local copy of the file to provide reconciled edits to the file;
   updating the local copy of the file with the reconciled edits;
   creating a data packet with the reconciled edits;
   transmitting the data packet around the token ring; and
   using a Document Object Model (DOM) representation to represent the file, wherein determining the location of the edited portion of the local copy of the file includes using a post-order or in-order traversal of the DOM representation to obtain numbers that represent the location of the edited portion.

2. The method of claim 1, further comprising storing the computer file as an XML document.

3. The method of claim 1, wherein creating a data packet includes creating a data packet with an XML fragment represented as a Simple Object Access Protocol (SOAP) message.

4. The method of claim 3, wherein transmitting the data packet includes transmitting the data packet using an HTTP/HTTPS protocol.

5. The method of claim 4, wherein transmitting the data packet include transmitting the data packet using Secure Sockets Layer (SSL) encryption.

6. The method of claim 1, wherein creating the data packet with the reconciled edits includes creating the data packet with the numbers that represent the location of the edited portion.

7. The method of claim 1, wherein broadcasting the location to the other computers includes broadcasting numbers to the other computers, the method further comprising including the IP or host name of the broadcasting computer with the broadcasted numbers.

8. The method of claim 1, wherein receiving conflicts from the other computers includes receiving a conflicting portion of a local copy of the file for at least one of the other computers.

9. The method of claim 1, wherein capturing the token circulating around the token ring includes capturing the token circulating around a virtual token ring that includes Internet connections.

10. A method for collaboratively editing a computer file using a plurality of computers in a network, wherein the computers are connected using a token ring, each of the computers has a local copy of the file, a first computer has edited its local copy of the file, and the method is performed by a second computer, the method comprising:
    receiving a broadcast message from the first computer, wherein the broadcast message identifies a location of an edited portion of the file, wherein receiving the broadcast message includes receiving numbers representing the location of the edited portion based on a Document Object Model (DOM) representation of the file;
    determining if a local copy of the file for the second computer has been edited at the location identified in the broadcast message;
    if the local copy of the file for the second computer has been edited at the location identified in the broadcast message, transmitting conflicts back to the first computer, wherein the first computer reconciles its edits with the conflicts to provide reconciled changes to the file in a data packet;
    receiving the data packet on the token ring; and
    updating the local copy of the file for the second computer with the reconciled changes contained in the data packet.

11. The method of claim 10, further comprising:
    identifying that the local copy of the file for the second computer includes a late edit which was not included in the conflict transmitted back to the first computer;
    setting a bit in the data packet;
    after the first computer clears the data packet to provide an empty token with the bit set,
      receiving the token;
      determining a location of the late edit;
      broadcasting the location of the late edit to the other computers;
      receiving conflicts from the other computers;
      reconciling the conflicts from the other computers with the late edit to provide reconciled late edits to the file;
      updating the local copy of the file with the reconciled late edits;
      creating a second data packet with the reconciled late edits; and
      transmitting the second data packet around the token ring.

12. The method of claim 10, wherein transmitting conflicts back to the first computer includes transmitting a conflicting portion of the file back to the first computer.

13. The method of claim 10, wherein updating the local copy of the file for the second computer including updating an XML format of the local copy of the file for the second computer.

14. The method of claim 10, wherein receiving the data packet on the token ring includes receiving a Simple Object Access Protocol (SOAP) message that includes a representation of an XML fragment.

15. A system for collaboratively editing a computer file, comprising:
    a network of computers adapted to communicate with each other through an Internet connection,
    wherein each computer has a local copy of the computer file, and each computer is adapted for use to edit each computer's own local copy of the computer file,
    wherein the network of computers are connected using a virtual token ring, and
    wherein, when its own local copy of the computer file has been edited, each computer is adapted to:
      capture a token circulating around the virtual token ring;

determine a location of an edited portion of its own local copy of the file;

broadcast the location to the other computers in the network;

receive conflicts from the other computers;

reconcile the conflicts from the other computers with the edited portion of its own local copy of the file to provide reconciled edits to the file;

update its own local copy of the file with the reconciled edits;

create a data packet with the reconciled edits;

transmit the data packet around the token ring, wherein each computer in the network is adapted to use a Document Object Model (DOM) representation to represent the file, determine the location of the edited portion using a post-order or in-order traversal of the DOM representation to obtain numbers that represent the location of the edited portion, and broadcast the location using the numbers from the DOM representation.

16. The system of claim 15, each computer is adapted to:

receive a broadcast message from a broadcasting computer in the network, wherein the broadcasting computer edited its local copy of the file and the broadcast message from the broadcasting computer identifies a location of an edited portion of the file;

determine if its own local copy of the file has been edited at the location identified in the broadcast message;

if its own local copy of the file has been edited at the location identified in the broadcast message, transmit conflicts back to the broadcasting computer, wherein the broadcasting computer reconciles its edits with the conflicts to provide reconciled changes to the file in a second data packet;

receive the second data packet on the token ring; and update its own local copy of the file with the reconciled changes contained in the data packet.

17. The system of claim 15, wherein the local copy of the computer file for each computer in the network is an XML document.

18. The system of claim 15, wherein each computer in the network is adapted to create a data packet with an XML fragment represented as a Simple Object Access Protocol (SOAP) message.

* * * * *